United States Patent [19]

Minks

[11] Patent Number: 4,490,779
[45] Date of Patent: Dec. 25, 1984

[54] ELECTRIC POWER SYSTEM

[76] Inventor: Floyd M. Minks, 2155 Dick Island Rd., Kissimmee, Fla. 32741

[21] Appl. No.: 357,892

[22] Filed: Mar. 15, 1982

[51] Int. Cl.³ .............................................. H02M 1/14
[52] U.S. Cl. ...................................... 363/48; 363/86; 363/128; 323/269
[58] Field of Search .................................. 363/44–48, 363/86, 124, 128; 323/269, 273, 280–281

[56] References Cited

U.S. PATENT DOCUMENTS

| | | | |
|---|---|---|---|
| 2,995,697 | 8/1961 | Grenier | 363/46 X |
| 3,264,518 | 8/1966 | Stauverman | 363/128 X |
| 3,348,122 | 10/1967 | Todd | 363/86 |
| 3,395,317 | 7/1968 | Hanson | 363/46 X |
| 3,546,494 | 12/1970 | Wanlass | 363/48 X |
| 3,600,663 | 8/1971 | Wagner | 363/46 |
| 3,670,230 | 6/1972 | Rooney et al. | 363/46 |
| 4,257,091 | 3/1981 | Kaufman | 363/128 X |

FOREIGN PATENT DOCUMENTS 0197706 12/1975 U.S.S.R. .............................. 323/276

Primary Examiner—Peter S. Wong
Attorney, Agent, or Firm—Duckworth, Allen, Dyer & Pettis

[57] ABSTRACT

Disclosed is an electrical power system adapted to receiving power from a source of alternating current, typically a small alternator, and supplying a direct current potential to a load. This power system includes two stages, the first stage comprising switchable rectifying devices such as silicon controlled rectifiers which interact with the impedance of the alternator or other source of alternating current power as a switching regulator to create an intermediate direct current potential.

The second stage operates from this intermediate direct current potential to produce a slightly lower output voltage, and creates a more accurate regulation than is possible with the first stage alone, the second stage greatly reduces ripple and high frequency noise components contained on the output of the first regulator stage. The second stage serves as an active low pass filter tuned to a desired DC voltage. In combination these two stages produce light weight, highly efficient power systems while providing an output that is essentially pure DC so that load devices such as aircraft radios or electronic computers may be connected directly to the output with or without a battery in parallel with the output.

20 Claims, 2 Drawing Figures

ELECTRIC POWER SYSTEM

BACKGROUND OF THE INVENTION

1. Field of the Invention

This invention relates to a rectifier regulator system adapted to receiving power from a source of AC power such as a permanent magnet or rotating field alternator and supplying direct current to a load such as the communications and navigation radios in an aircraft. This regulator may take the form of a two stage device, the first stage being a switching regulator, the second stage being a linear device in the form shown. These are adapted to work together, however each stage defines unique improvements over the prior art in their own field.

2. Description of Prior Art

Typical small aircraft power systems of recent manufacture contain an adaptation of an automotive-type alternator in which a rotating member consists of steel poles and a copper winding to produce the required rotating magnetic field. The power to this winding is supplied through slip rings or similar devices. The stator which is stationary, usually is wound three phase and connected through diodes to the output terminal of the alternator which is connected to the aircraft battery. A solid state regulator senses the charging voltage of the battery and controls the excitation current to the field either by changing the effective resistance value between the field and the battery or by switching the connection between the battery and the field on and off at a high rate with an on duty cycle depending on the field current required to maintain the required output.

An alternator regulator setup of this type produces large amounts of electrical noise arising from arcing of the slip rings, switching transients in the field circuit and from recovery time transients associated with the diodes in the stator output circuit. It is general practice to use capacitive, or a combination inductive and capacitive filtering, in the output of the alternator to somewhat reduce this noise level. Also the impedance of the battery in parallel with the output bypasses much of this noise to ground. However, even with these precautions the remaining noise level is enough to be noticeable and therefore degrades the performance level of modern avionics. The response time of this type of regulator is long, compared to the period of the AC output of the alternator winding. Therefore this type of system cannot reasonably operate without a battery in the system. Removal of the battery, either intentionally to save weight in certain applications or inadvertently because of failure of the battery or associated wiring often results in overvoltage failures of avionics.

It should be noted it is common practice to turn off all radios in an aircraft before starting or stopping engines because of the transients which may be created by the alternators as well as other systems are of such magnitude they may be destructive to avionics. Further, the brushes and slip rings associated with this system have limited life, particularly at high altitude. Mean/time before brush failure of some alternators used in general aviation aircraft today, when operated at 20,000 feet, is below 50 hours. Further, the residual magnetism in these alternators is often so low that if the engine is started, such as by hand propping, when the battery is completely discharged, the alternator will not start to charge the battery.

Permanent magnet alternators can be manufactured by currently known processes to produce approximately the same output for approximately the same weight and speed as the wound rotor machines; however, the permanent magnet alternators have generally not found use in such general aviation airborne applications. One of the reasons is the lack of a suitable regulator. Alternators of this type are often employed on such vehicles as motorcycles, snowmobiles, and outboard motors. In these cases, regulation is accomplished generally by use of switching devices such as silicon controlled rectifiers, either in series or in shunt, as part of the network between the alternator and the battery. This type of rectifier-regulator combination produces high values of electromagnetic interference commonly called radio noise, which is generally not a problem in the application previously mentioned because these vehicles do not commonly have electronics susceptible to such noise as aircraft must for communications and navigations.

The objectives and purposes of this invention are as follows:

(1) to produce a simple, light, inexpensive, and highly efficient system to rectify and regulate the output of an alternator and to produce pure DC suitable for operating the electrical systems of an aircraft or other vehicle, so that this output may be compatible with the needs of solid state electronics devices such as communication and navigation radios as well as computer and guidance systems of the type found in airborne applications;

(2) to eliminate the need for a battery completely or to permit the continuing operation of the electronics of a system with a battery in case of battery failure;

(3) to eliminate any transients upon the starting and stopping of the alternator, rectifier, regulator system which may damage the loads connected to the system;

(4) to produce a highly accurate output voltage unaffected by wide ranges of load or speed of the alternator or by a wide range of temperature;

(5) to produce a power system which will not be damaged by sudden changes in load to include all load resistances from zero to infinity and that even with sudden steps in magnitude of the load will not produce transients or overshoots in the output which might damage solid state devices contained in the loads;

(6) to produce a power system in which the power semiconductor devices are all attached electrically as well as thermally to the heat dissipating surfaces either of a grounded heat sink or one additional isolated heat sink;

(7) to produce a power system capable of starting without a battery or any other source of external power, under even the adverse combination of very low ambient temperature such as −65° C. and a load resistance corresponding to several times lower than the resistance which would normally be associated with the full power output of the alternator. This last stated purpose is particularly desirable since certain types of airborne equipment such as the power supply sections of increasingly common radar systems present a negative impedance to the power system that supply their direct current input power; and because aircraft are frequently required to operate at very low ambient temperatures.

SUMMARY OF THE INVENTION

This invention relates to an electrical rectification and regulation system comprising two stages and adapted to be connected to a source of alternating current power, such as a permanent magnet alternator. The first stage is a bridge circuit containing two diodes and two silicon controlled rectifiers. This first stage also contains the means for sensing the output of that stage for comparing it to a desired value and controlling the gate pulses to the silicon controlled rectifiers to maintain voltage at the desired value. A capacitor across the output of the first stage reduces the magnitude of the AC or ripple components of its output. The first stage is followed by a second stage which is an active, low pass filter which may be set to a desired direct current voltage. The purpose of this stage is to provide more accurate regulation and/or lower AC ripple and noise output than is possible with the first stage only.

BRIEF DESCRIPTION OF THE DRAWINGS

It shall be understand that even though FIGS. 1 and 2 are based on a single phase full wave bridge, the teachings of this invention may be applied to half wave as well and also to multiphase applications, such as three phase power sources.

DETAILED DESCRIPTION OF THE PREFERRED EMBODIMENT

(1) Electrical Power System

Figure 1:
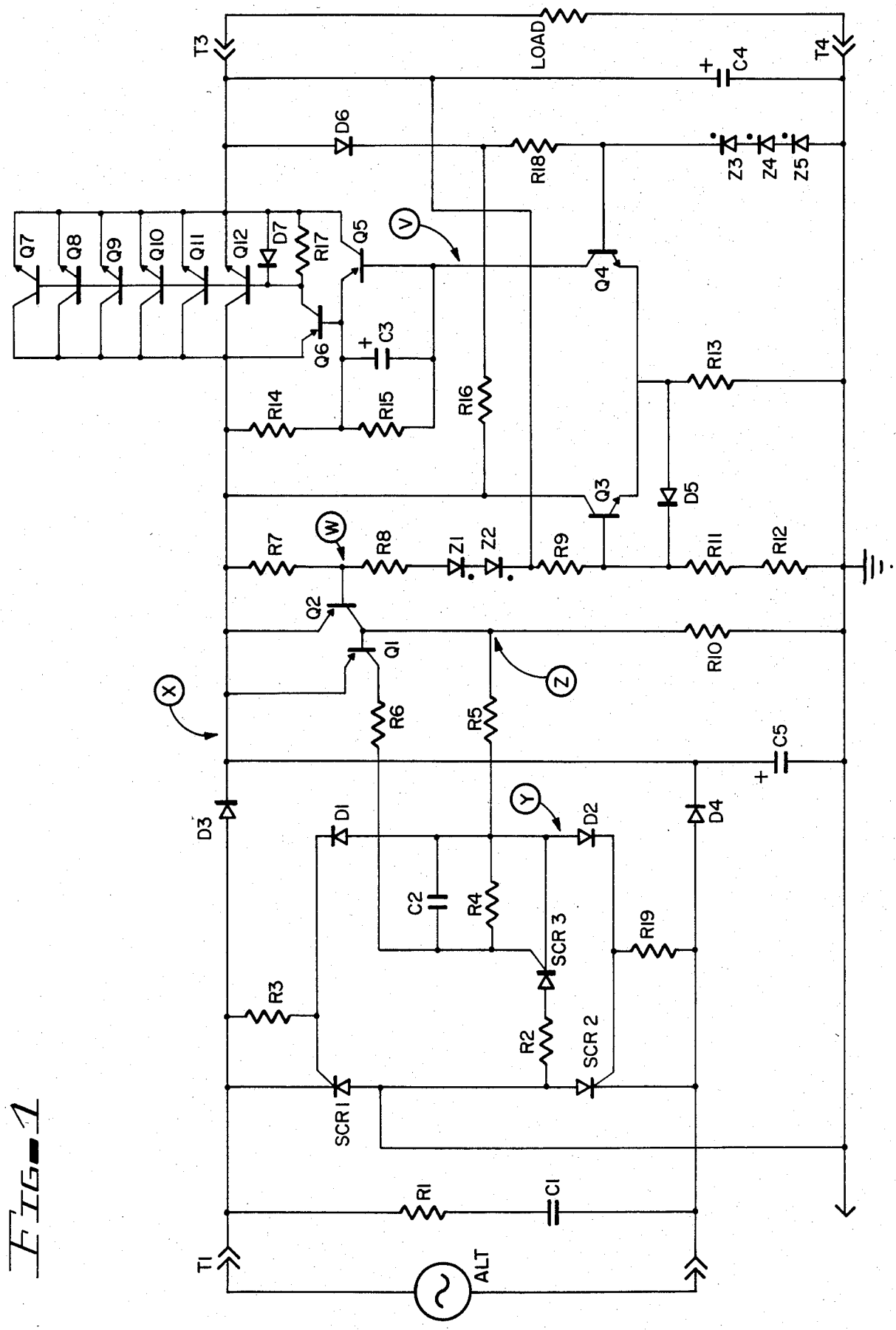
FIG. 1 shows a circuit diagram of a preferred embodiment of this invention.

A circuit for receiving alternating current from a source of power, such as an alternator, and supplying direct current to a load is shown in FIG. 1. Values given in this description will be typical of a system adapted to supply 40 amps or less to a 28 volt load; however, one skilled in the art may adapt this invention easily to other voltage and current levels. The values given are stated to aid in the understanding of the circuit and are not intended to restrict the scope of this invention.

The regulator receives power through terminals labeled T1 and T2 from AC power shown as an alternator. Typically this may be a permanent magnet alternator consisting of a stationary stator surrounded by a steel rim to which are mounted a number of permanent magnets. However, many other sources of alternating power may be used, such as field excited machines or a conventional power line such as a 120 volt, 60 cycle connected in series with a suitable current limiting impedance such as an inductor. The following description will be based upon the use of a permanent magnet alternator, the internal impedance of which is primarily inductive. Some applications of this invention may require shielding such as a grounded braid over the leads from the alternator to T1 and T2 to eliminate the radiation of radio frequency energy from these leads.

Diodes D3 and D4 and silicon controlled rectifiers or other switching devices shown as SCR1 and SCR2 are connected in a bridge configuration between the alternator and a first stage filter capacitor labeled C5. Thus, the voltage across C5 may be controlled by the application of appropriate gate signals to SCR1 and SCR2 up to the maximum voltage or current output capability of the alternator.

Application to a 3 phase delta connected alternator could be made with four additional components corresponding in connection and use to SCR1, R3, D1 and D3.

Since the alternator has a inductive internal impedance, conduction of one of the SCR's (SCR1 or SCR2) produces a phase shift in the current output of the alternator compared to what its open circuit voltage would be. Therefore, if the other SCR is not gated on immediately on the end of the conduction of the first SCR, the forward voltage across the second SCR will rise quite rapidly, possibly exceeding the established maximum rate of change of voltage with time for the silicon controlled rectifiers SCR1 and SCR2.

The magnitude of this rate of change of voltage with the time is reduced and controlled by capacitor C1 and resistor R1 shown connected across the alternator. The value of C1 actually controls the rate of rise of this voltage, and the resistor R1 controls the transient from the discharge of C1 when the next gate pulse occurs to SCR1 or SCR2. Thus, R1 serves to reduce the di/dt required of SCR1 and SCR2 and the resulting electrical noise or electromagnetic interference. Typical values would be 30 ohms for R1 and 0.05 microfarads for C1.

In the typical embodiment described here, diodes D3 and D4 and SCR1 and SCR2 could all be 40 ampere, 200 volt devices. Resistor R3 and R19 are connected from the gate to the cathode of SCR1 and SCR2 respectively; these resistors tend to stabilize the operation of the circuit at high temperatures where significant leakage may exist in either SCR1 or SCR2.

It should be noted that in the embodiment of the invention shown, the anodes of SCR1 and SCR2 are electrically connected to ground for the positive output system with negative output to ground. Since negative ground is the most common configuration in vehicular and aircraft applications, this arrangement is highly desirable compared to grounding the anodes of the diodes shown as D3 and D4. This is because commercially available diodes will operate at higher temperatures than commercially available silicon controlled rectifiers, and because the case or heat transfer surface of commercial SCR's is the anode; thus, the thermal impedance from the junction to the heat sink most generally grounded is less critical on the diodes than the silicon controlled rectifiers.

Cathodes of diodes D3 and D4 and the positive terminal of capacitor C5 are tied together to the point that will be henceforth referred to as the output of the first stage and is labeled as point X.

Referring again to FIG. 1, Y refers to a circuit connection point which will be used in the following description of the gate control circuitry for SCR1 and SCR2. Point Y is connected to the anode of a diode D1, with the cathode of that diode connected to the gate of SCR1. Point Y is also connected to the anode of the diode D2, with the cathode of diode D2 being connected to the gate of SCR2. Therefore, if a current path is created from ground to point Y, current will flow through either D1 or D2 to which ever SCR gate, which at that instant, is more negative with respect to its anode, that being the SCR which at that instant can be turned on to allow the flow of power from the alternator to point X. Once turned on either SCR1 or SCR2 remains on unitl its anode current is reduced to zero as a result of the alternator output waveform.

The flow of current from ground to point Y is allowed and controlled by a third SCR designated SCR3, and a resistor R2 connected in series with its anode to ground, the cathode of SCR3 being connected directly to point Y. Thus when SCR3 is gated on either SCR1 or SCR2, whichever is at that instant biased in the direction it can conduct will be gated on. For purposes of the following portion of this circuit description, assume that at a given instant the anode of SCR1 is positive with respect to its cathode. Further assume that neither SCR is conducting. Therefore, SCR2 must be reversed biased since SCR1 and SCR2 cannot both be forward biased at the same time, thus at the instant in this example, if a gate pulse is supplied to SCR3 it will turn on. If the turn on speed capability of SCR3 is much faster than that of SCR1 then the current through SCR3, D1, and the gate of SCR1 will be limited by R2 thus allowing relatively small and inexpensive components to be used for SCR3 and D1. However, it should be realized that with some component parameters R2 may be omitted from the circuit. Typical value of SCR3 in the example previously discussed would be a 200 volt, ½ amp device. Also typical would be; R2, 10 ohms, R3 and R19, 19 ohms.

As soon as SCR1 turns on voltage from its anode to cathode decreases to its forward voltage drop which typically would be between one and two volts. This is larger than the sum of the forward voltage drop of SCR3, diode D1 and the gate voltage to fire of SCR1, thus forcing SCR3 to turn off since its anode current is reduced to zero. If gate potential sufficient to fire SCR3 is applied during the next half cycle, diode D2 will similarly conduct, turning on SCR2, allowing power to flow through SCR2 and D3 from the alternator to point X. This supplies a load current effectively flowing between point X and ground, said ground point also being described by label T4.

Devices which may be typically used for SCR3 or have a gate current to fire of a few micro amperes and a gate voltage to fire of 0.5 to 0.8 volts. Resistor R4 and capacitor C2 are connected between the gate and the cathode junction of SCR3 to prevent this device being turned on from low level leakage or capacitive coupling respectively, inherent in the device which controls this circuit shown as transistor Q1. Q1 represents a control device capable of controlling relatively high voltages at relatively low currents. It has three terminals, an input terminal, an output terminal, and a common input-output terminal. While it is shown as a PNP transistor, other devices may be substituted. The emitter is shown as the common input-output terminal and is connected to point X. The base is shown as the input terminal and the collector is the output terminal. The collector is connected through a current limiting resistor R6, to the gate of SCR3. For the example being given here a transistor with a peak collector current capability of 10 milliamperes or more and a collector base breakdown voltage of at least 200 volts would be suitable. However average power dissipation in this device would be negligible, under 10 milliwatts in this example. Representative values for R6 and R4 would be both 10k ohms and for C2 would be 0.2 microfarads. For purpose of description, the Base of transistor Q1 is defined as point Z. A resistor R5 connects point Z to point Y, point Z is also connected to the negative output, shown as ground, through a resistor designated R10. Upon the initial startup of the power system the voltage of point X may be zero, however, it can be seen that as soon as the alternator produces voltage, the path through either D1 and R3, or D3 and R19 will produce an instantaneously negative potential at point Y compared to point X. Thus, current will flow through resistor R5 and the base emitter junction of Q1, turning Q1 on. This occurs as previously mentioned with zero voltage on point X with respect to ground and before either SCR1 or SCR2 have been gated on. This will turn on Q1 which will supply current through R6 to produce a gate signal to SCR3 turning it on and as previously described, gate on SCR1 or SCR2 as is appropriate at that instant, thus creating a positive potential at point X with respect to ground. As soon as this potential is created current will flow through resistor R10 further biasing transistor Q1 in the on direction. For the example, a typical value of R5 would be 100K ohms and for R10 would be 7K ohms. This arrangement has the further advantage that a gate signal can be produced at the point where the anode voltage of either SCR1 or SCR2 just starts to become positive with respect to its cathode. This is because direct current voltage existing between point X and ground is available to supply the voltage drops in Q1, R6 and the gate voltage to fire for SCR3, thus allowing the firing of SCR1 or SCR2 very nearly at the crossover point from negative to positive voltage on their anodes, respectively, compared to their cathodes. This minimizes the generation of unwanted high frequency transients which can generate radio frequency interference.

It should be apparent from the foregoing description that the controlled device Q1 is normally biased in the "on" direction by an effective current source supplied through resistors R5 and R10. R5 supplies the current for startup and R10 predominates after startup.

It is the purpose of the second control device, labeled Q2, and shown as a PNP transistor, to remove this normal "on" bias from Q1 by creating at selected times, a low impedance shunt path from the emitter to the base of Q1, or with respect to the points previously defined, from point X to point Z. Q2 is shown with its emitter connected to point X, its collector connected to point Z and its base or input terminal connected to its emitter through a resistor shown as R7.

To further describe this circuit the control or base terminal of Q2 is designated as point W. The base emitter voltage necessary to turn on a bipolar transistor is a known parameter and has a relatively predictable value that does not vary appreciably from one transistor to another within a given family, and has a quite predictable negative temperature coefficient. In most cases this temperature coefficient is about 2 millivolts per degree celsius.

R7 would normally be chosen so that the current through it at this base emitter saturation voltage is very large compared to the actual base current required for the device to supply the collected current represented by the current flow previously described through R5 and R10. Thus current flowing out of point W (such as through resistor R8) when it reaches the magnitude that it will produce a drop across R7 equal to the base-emitter saturation voltage of device Q2, will turn Q2 on, this will shunt the current going through R5 and R10 away from the base, or control electrode, of Q1 turning that device off, in turn removing the gate signal from SCR3; this, in turn, removes the gate signal from SCR1 and SCR2 to prevent more power from being delivered to point X until the current out of the control point W through resistor R8 is reduced.

Point W is connected to the output terminal of the supply, shown as T3, through resistor R8, zener diode Z1 and zener diode Z2 in series. The commercial processes which produce relatively low voltage zener diodes, say for instance between 3 and 10 volts, produce components with normal commercial tolerances of ±5 to ±20%. If these devices are operated in the forward biased mode, the forward characteristic is typically that of a silicon diode; however, the rate of change of voltage with a given change in current around a selected operating point is generally more predictable and represents a lower dynamic impedance than that in most normal diodes. It also should be noted that this parameter, at a given temperature is usually predictable with an accuracy of 2% even from one manufacturing lot to another. Also a very predictable negative temperature coefficient of this voltage exists which is useful in this circuit.

Because of the previously mentioned characteristics, Z1 and Z2, in the forward biased mode, are used as the major portion of a voltage reference. This reference is used to establish the amount by which the average voltage at point X exceeds the voltage on the positive output terminal of this supply or T3. It will be understood that other voltage reference devices may be substituted.

This voltage difference between points X and T3 becomes the operating voltage across the second stage of this supply. The remaining portion of this voltage reference is the base emitter saturation voltage of transistor Q2 when operating at a collective voltage of approximately 0.6 volts and a collector current established by the Ohms law relationship between the voltage from X to ground and the value of resistor R10. This voltage must be multiplied by, and can therefore be somewhat adjusted by (R7+R8)/R7. Values of the resistors used must be substituted in the preceding equation, with the selection of R7 sufficiently low such that the current throught R7 is very large compared to the actual base current of Q2. Typical value of R7 might be 60 ohms, for R8 30 ohms. Z1 and Z2 typically might be ¼ watt zener diodes of a nominal 4 volt, 20% rating. These values would establish a voltage difference between the average voltage at point X and the voltage at the output terminal T3 to approximately 2½ volts at 25° C. with a negative temperature coefficient of approximately 6 millivolts per degree centigrade. If the voltage at point X tended to rise above this 2½ volt point conduction through R8, Z1, and Z2 would increase, turning on Q2. This in turn would remove the base drive from transistor Q1 which removes the gate drive from SCR3 and in turn from SCR1 and SCR2, preventing further power transfer from the alternator to point X and the associated capacitor C5. Conversely, if the voltage at point X tended to decrease below the example value of 2½ volts positive compared to terminal T3, the current through R8, Z1 and Z2 would decrease turning off transistor Q2. Therefore, transistor Q1 would be turned on, in turn supplying a gate signal to SCR3 and thus to SCR1 and SCR2 so that power could flow from the alternator to point X through the rectifier bridge consisting of SCR1, SCR2, D3 and D4, preventing a further decrease in the voltage at point X. The negative temperature coefficient of this voltage established between point X and the output terminal T3 is highly desirable since it minimizes the creation of heat in the output stage at high temperature which is exactly the point where further heat would tend to be destructive to semiconductor devices, but at the same time increases this voltage across this stage at very low temperatures where the saturation voltages of the transistor in the output stage tend to increase therefore requiring more voltage to maintain proper operation.

The circuit composed of Q2, R7, R8, Z1 and Z2 can be expected to maintain the voltage difference between point X and terminal T3 to a accuracy of ± approximately 1/10 of a volt to account for variations normally expected in readily available inexpensive commercial components used in these locations without specific calibration or selection of components for each individual supply. This value is well within reasonable tolerances for the function of this two stage regulator and therefore this circuit satisfies a design objective of eliminating the necessity for calibration of the inner stage voltage, that is the voltage from point X to ground as an independent step from calibrating the output voltage or voltage from terminal T3 to ground, said ground also being labeled as terminal T4.

The effects of temperature on semiconductor device characteristics are well known and described in the literature and will be apparent to one skilled in applying such art as disclosed herein.

It should also be noted that the current through Z1 and Z2 used as reference devices is established by the base emitter saturation voltage of transistor Q2 and the resistor R7 at the regulation point, thus establishing the voltage difference between point X and output terminal T3 independent of the voltage between the terminal T3 and ground or terminal T4. Thus, this voltage is not affected by an overload on the output terminals of the supply and does not tend to decrease with this output voltage. The supply, is therefore capable of starting from an initial condition with a very low load impedance connected, and the alternator initially standing still and accelerated from that condition to an operating RPM, without any external voltage being supplied and without the necessity of specifying the voltage drop across Z1 and Z2 at levels far below their normal operating point.

R8 has the additional function of controlling the transient current through the base of transistor Q2 and Z1 and Z2 to within safe levels if the output terminals of the supply are suddenly shorted or overloaded while the supply is in operation.

Consistant with the example values being given, the filter capacitor C5 is an electrolytic capacitor of 30,000 microfarads with a voltage rating of 35 volts and the voltage from point X to ground could typically be expected to regulate within ±¼ of a volt from no load to the full load that the alternator will supply at a given speed, and from that minimum speed that the alternator can supply the load to the maximum design rpm. For a 12 pole alternator and 40 amp maximum load, the peak to peak value of the ripple voltage on C5 will be approximately 1 volt or less depending on speed and load. The function of the remaining components in the FIG. 1 will now be described. They can be grouped together as forming the second stage of this two stage regulator. It is the purpose of this stage to further improve the regulation and/or decrease the ripple and transient components appearing at the output terminal T3. Thus, the second stage functions as an active, low pass filter set to a given DC voltage. The second stage can be most readily understood by describing it in two sections. The first section being composed of transistors or amplifying devices Q5, Q6, Q7, Q8, Q9, Q10, Q11, and Q12 and associated resistors R14, R15, and R17, diode D7, and capacitor C3. These devices taken together may be thought of as simulating a very high current, very high gain, PNP transistor, with its emitter connected to point X, its collector connected to terminal T3, and its base connected to the point labled as V. It should be realized that bipolar transistors are shown and used in the description of this circuit as the required amplifying devices; however, one skilled in the state of the art may substitute within the scope of this invention other types of amplifying or control devices which in general terms would have an input terminal, an output terminal, and a common input-output terminal, generally corresponding to the base, collector and emitter terminals respectively of the bipolar transistors shown.

The remaining components, R9, R11, R12, R13, R16, R18, D5, D6, Z3, Z4, Z5, Q3, and Q4, serve to create a stable voltage reference and to compare the output voltage existing at terminal T3 with that voltage reference, and to either increase the control or base current to the previously mentioned transistor equivalent (point V) if the voltage at terminal T3 tends to decrease below the desired level, or to decrease the drive current at that control or base terminal if the voltage at terminal T3 tends to increase above the desired level. Thus, a closed, frequency dependent feedback loop is created, resulting in an output of accurately regulated direct current with a minimum of ripple or noise content.

This voltage reference and comparison circuit, as shown, is constructed of discrete components. However, it will be realized by those skilled in the state of the art that integrated circuits are available through commercial channels which can serve these functions. Integrated circuits however, are not as immune to transients which may be encountered under some applications of this invention as the discrete component shown in FIG. 1 may be specified to be. It should also be realized that many other arrangements of discrete components may be readily applied by those skilled in the known state of the art to supply the required voltage reference and comparison functions.

The voltage reference devices for this supply are shown as three series connected zener diodes Z3, Z4, and Z5. Depending upon the space available, the degree of temperature compensation necessary, and the cost of the components and the regulation accuracy required these might be replaced by a single diode. Use of three each commercial type 1N825 which is a 6.2 volt nominal, temperature compensated zener would be consistant with the example values being given.

The current through these zener diodes Z3, Z4, and Z5 is normally controlled primarily by resistor R18 and also flows through diode D6. The voltage across R18 may be computed by subtracting the sum of the zener diode voltages and the forward voltage drop of diode D6, typically 7/10 of a volt, from the design output voltage, in the example case 28 volts. Application of Ohms law gives the required value of R18 for the design operating point of the zener diodes. In this example, 1.2K ohms would be appropriate.

Since the current for the reference diodes is drawn through D6 from the output which is accurately regulated and contains low ripple component, current through and therefore low voltage across the zener diodes is extremely stable. It is the purpose of resistor R16 to supply sufficient current through and therefore sufficient voltage across the zener diodes to assure that the supply is capable of starting from an initial condition with the alternator at rest and a low load impedance connected. The value of R16 might typically be 20 times the value of R18. Diode D6 prevents the small current which flows through R16 under initial starting conditions, from being diverted to output terminal T3.

The junction between R18 and cathode of zener diode Z3 is connected to the input terminal of an amplifying device Q4 shown as the base of a NPN bipolar transistor. Transistor Q4 is connected in a configuration well known in the literature and to those skilled in this art, with another similar amplifying device Q3, as a differential comparitor. The common input-output terminals of these amplifying devices, shown as emitters, are connected together and through a current limiting resistor R13 to ground. Resistors R9, R11, and R12 are connected in series as a voltage divider across the output, that is from terminal T3 to ground.

The values of R9 compared to the sum R11 and R12 are calculated to give a voltage at the junctions of R9 and R11 equal to the sum of the voltages of the reference elements Z3, Z4, Z5, when the output voltage at terminal T3 is at its desired level. However, the readily available commercial tolerances in these components is not as tight as the tolerance which may be required for the calibration accuracy of this supply. Therefore, resistor R12 would be selected to calibrate the individual supply. The accuracy obtainable is quite high if the resistors are stable and the value of R12 is much lower than the value of R11. Use of a relatively high reference voltage such as the 19 volts in the example circuit minimizes the effects of any slight differences in the characteristics of Q3 and Q4. Thus, in many applications of this invention a matched transistor pair will not be required for Q3 and Q4. The values consistent with the example being presented here would be R13-7K ohms, R9-4K ohms, R11-7.5K ohms, R12-1K ohms. Transistors Q3 and Q4 are operated at a collective voltage of approximately 10 volts, and in a collector current of 3 milliamperes or less.

The components surrounded by the dotted line on FIG. 1 comprise what will be refered to as the pass stage. This stage can be viewed as a three terminal device with an input terminal labeled point V and output terminal connected to point T3 and a common input-output terminal connected to point X. It is the purpose of this stage to supply the voltage gain, current gain, and power dissipation capability required for proper operation of the power supply.

An analogy may be made to a PNP transistor with point X connected to the emitter, point V connected to the base, and terminal T3 connected to the collector. Proceeding with this analogy, it is the purpose of this unique arrangement of components to have a very high current gain combined with low emitter collector and emitter base saturation voltages. This stage is shown in the figures as being composed of bipolar transistors and associated resistors, a diode and a capacitor. However, it should be realized that other amplifying devices with similar functioning connections may be substituted and that if each transistor shown as a PNP were replaced by an NPN and each transistor shown as an NPN were replaced by an PNP the functioning of the circuit would remain equivalent.

In the form shown, the circuit has three stages of gain. These are a low current stage, labeled Q5, which will be referred to as a predriver, and an intermediate current stage, labeled Q6, which will be referred to as a driver, with a high current output stage, shown as a parallel combination of Q7 through Q12, which will be referred to as an output stage. It should be realized that the output stage may contain only one device or a large number of devices in parallel depending on the current requirement. The following values will be appropriate for the 28 volt, 40 amp regulator being used as an example to help in the understanding in this invention. Each transistor is shown with a resistor parallel with the base emitter-junction, thus reducing the effect of transistor leakage currents, particularly at high temperature. Thus R15 is connected across the base-emitter junction of the predriver stage, R14 across the base emitter junction of the driver stage and R17 across the base emitter junction of the output stage. Example values would be 1000 ohms for R15, 150 ohms for R14, and 15 ohms for R17.

A capacitor C3 is also shown connected between the base and emitter, or input and common input-output terminals, of the predriver stage. It is the purpose of this capacitor to give a reduction, or rolloff, of gain with frequency so as to prevent instabilities or unwanted transient overshoots at high frequency. Commercial transistor types 2N6101 would be appropriate for Q7 through Q12, 2N6491 for Q6 and 2N6111 for Q5. These devices allow sufficient surge and steady state current capacity to prevent damage even if the power supply was suddenly and repeatedly short circuited. In the short circuit condition the steady state current would be limited by the AC source shown as an alternator in FIG. 1.

In the following description the high current stage will be referred to as a single transistor Q7 even though as previously described it may be a parallel combination of devices. Point X is connected to the collector of NPN transistor Q7 and also to the emitter of PNP transistor Q6. The collector of transistor Q6 is connected to the base of transistor Q7 the base of Q6 is connected to the emitter of PNP transistor Q5, the collector of transistor Q5 is connected to the emitter of transistor Q7 and to the terminal T3. The base of transistor Q5 is connected to point V.

One knowledgable in the ratings of devices of this type, which are quite typical of a large number of commercial devices in use today, will realize that the emitter-base saturation voltage of transistor Q6 plus the emitter-collector saturation voltage of transistor Q5 (because of the relatively low current through these paths) will be lower than the sum of the emitter-collector saturation voltage of Q6 and the emitter-base saturation voltage of Q7. Since these two paths are connected in parallel, the effective saturation voltage between point X and terminal T3 will be emitter-collector saturation voltage of Q6 plus the emitter base saturation of transistor Q7. 1.0 volts at 40 amps is typical for the device types given above. Therefore, Q5 will be operating at a collector voltage above the saturation value and thus in its active region. In the foregoing discussion, magnitude should be taken numerically as absolute values. The input saturation voltage of the circuit, or the voltage from terminal X to terminal V, can be seen to be the sum of the base-emitter saturation voltage of transistor Q6 plus the base-emitter saturation voltage of transistor Q5.

The current gain of the circuit will be the product of the current gain of the three stages, that is, $h_{FE}$ of Q5 times $h_{FE}$ of Q6 times $h_{FE}$ of Q7, with gain measured at the appropriately operating current for each stage. Allowance would also have to be made for the current flowing through the stabilizing resistors R14, R15, and R17.

Comparison will now be made with the Darlington transistor configuration. The Darlington configuration will not be shown or described in detail here since it is well described in the literature and understood by those working in this field. It is assumed that the Darlington is made from either a pair of NPN cor a pair of PNP transistors. This is the usual method. The Darlington transistor configuration has a base-emitter saturation which is the sum of the base-emitter saturations of two transistors and a collector-emitter saturation equal to the sum of the base-emitter saturation of one transistor and the collector-emitter saturation of another transistor. This is exactly the same as just described for the circuit shown within the dotted line, the difference being that the circuit shown as part of this invention has the gain of one additional transistor stage without the increase saturation voltages normally associated with adding of such an additional stage.

Thus, the circuit shown within the dotted line may be utilized to advantage in many applications requiring a high gain, low saturation voltage amplifying stage. This is particularly advantageous in a power system of this type since the voltage at point X needs to be set only higher than the voltage required at the output terminal T3 by the saturation voltage of the amplifying device connected between these terminals plus a small additional voltage to assure that the device is operated in its active region.

It should be noted as an object of this invention that not only the output but also the driver and predriver stages are operated at or near saturation in the conditions of severe overload or shortcircuit of the output of the supply, thus minimizing the heating and the chance of failure in these devices. To further minimize the dissipation in the devices upon short circuit of the output, it should be noted that with the short circuit on the output, resistor 9 is effectively in parallel with the series combination of resistors 11 and 12, thus presenting a relatively low impedance from the cathode of diode D5 to ground. This combination then effectively parallels resistor R13, increasing the emitter current that may flow through transistor Q4 to supply the required drive to the predriver stage Q5. Thus, protection from overload is supplied without resorting to low values of R13 which would result in highly imbalanced currents in Q3 and Q4 under operating conditions into a normal load. D5 further protects the base-emitter junction of transistor Q3 from high and possibly destructive inverse voltages which might otherwise exist as a transient upon sudden application of a short circuit from terminal T3 to T4. Typical value for capacitor C3 for the example being given would be 0.5 microfarrods. If the intended application of the supply may include connection of the output to a battery or connection of the output to a source auxilary or ground power, a diode shown as D7 may be desirable. If the connection to the external source of power is made before the alternator is producing output, capacitor C5 will not be charged; thus, the voltage connected to the output would appear in the reverse direction across the base-emitter junction of transistor Q7, and could be of such magnitude as to damage the transistor. The diode, shown as D7, across this junction bypasses this current to the base of transistor Q7. The current may then flow from the base to the collector terminal since that junction is forward biased. It should be noted as an object of this diode placement that this current flowing through the base-collector junction will be amplified in the transistor, resulting in an additional current flow through the reverse biased emitter-base junction. Thus, in effect, the collector is acting not as a collector but as an emitter, and the emitter is acting not as an emitter but as a collector. It is known that the gain of a transistor in this reverse-connected mode is relatively low; however, it is sufficient to considerably reduce the size required for diode D7 compared to an alternate location which would for its anode as shown to terminal T3 but its cathode to an alternate location directly to point X.

Capacitor C4 is connected directly across the output. It serves the function of an output filter capacitor used in most power supplies. In the example being given its value might range from a fraction of a microfarad to several thousand microfarads, depending on the nature of the load and temperature range over which the power system was designed to operate.

To complete the example being given for the design of a 40 amp, 28 volt output between terminal T3 and T4, 28 volt may be expected to vary approximately 10 millivolts from no load to full load and over the range of alternator speeds giving sufficient output to carry the load. Output ripple can be expected to be in the order of one millivolt or less. Voltage at point X could be expected to be approximately 30 volts with a ripple of approximately one volt peak to peak and a regulation at that point of approximately + or −2/10 of a volt over a range of load and speed.

The efficiency of the supply would be approximately 90% at full load and efficiency would not decrease appreciably with the output current decreased. This high efficiency at low output current compared to the rated load of the supply, is a highly desirable and unique advantage of this invention. It arises from the very low power dissipation necessary in the control circuits associated with transistors Q1, Q2, Q3 and Q4, and their associated components. Thus, almost the entire power dissipation is in the power bridge circuit SCR1, SCR2, D3 and D4 and in the transistor stage Q7, thus as the output current decreases, the power loss in these components decrease. This is an advantage over the usual switching power supply which may exhibit high efficiency at high load but generally is known to have relatively low efficiency at decreased load.

Operating from a given alternator, a supply of the type described herein has been shown to be capable of delivering a given load power at a speed lower than that obtainable by a high frenquency switching regulator. This comparison of the minimum alternator speed and therefore output that will supply a given DC load is the most critical measure of supply efficiency in many systems.

Figure 2:
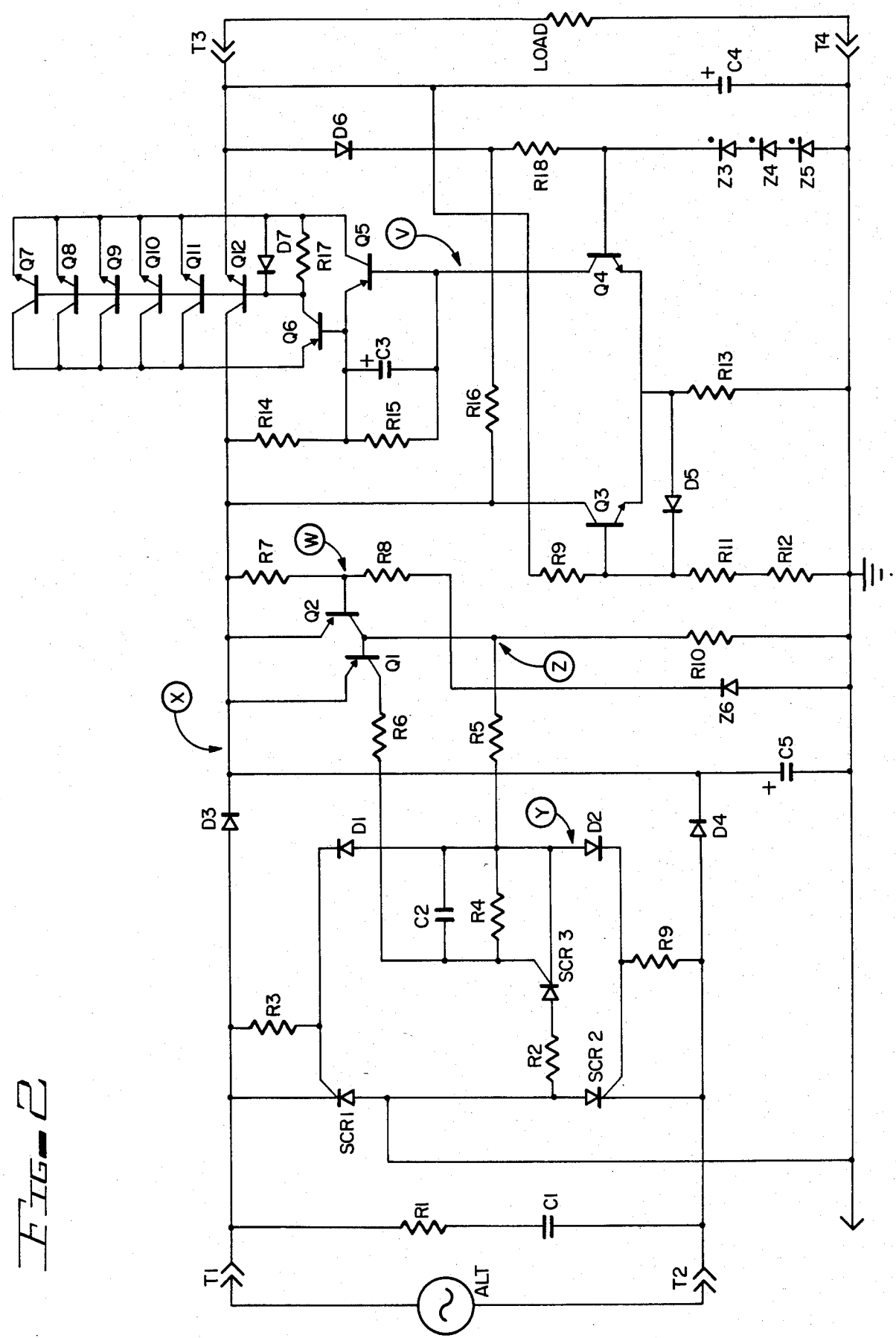
FIG. 2 shows the control or feedback loop for the first stage of the circuit shown in FIG. 1 modified to work independently of the second stage.

FIG. 2 in most respects shows a circuit which operates in the same way as the circuit shown in FIG. 1. All components with similar numbers serve the same purposes and thus will not be described again. Fig. 2 differs in that the reference for the interstage voltage, that is the voltage between point X and ground, is established by a reference to ground as opposed to a reference to the output terminal T3 as is shown in FIG. 1. Thus, Z1 and Z2, which in the forward biased mode of FIG. 1, completed the control loop of the first stage to the output of the second stage are replaced by a single zener labeled Z6. Z6 is connected from the end of resistor R8 to ground. Z6 is operated in the zener region and thus would be selected to have a zener breakdown voltage of approximately one volt below the desired voltage at point X. If it is desired to establish voltage at point X more accurately than is economical with the component placement shown in FIG. 2, resistor R8 could be eliminated, the cathode of zener Z6 would then be connected directly to the base of transistor Q2, the anode of Z6 would then be connected to the center point of a series combination of two resistors, with the ends of that resistor voltage divider connected to point X and ground. Thus, the voltage at point X could be accurately controlled by selecting or adjusting one of these last two described resistors. The required voltage for Z6 would thus be reduced by approximately the ratio of the voltage divider. It would also be possible since the temperature coefficient of zener diodes is known to be predictable as a function of the zener voltage, to combine this with the known temperature coefficient of the base-emitter saturation voltage of transistor Q2, to produce a known temperature coefficient of the voltage appearing from point X to ground. The circuit, as shown either in FIG. 2 or as just described, allows the operation of the first stage completely independent of the operation of the second stage, and therefore in some noncritical applications the second stage of the supply could be eliminated completely. It should be realized that the functions attributed to Z6 and its associated resistors could be replaced by any combination of devices which effectively produce an increasing base current in transistor Q2 when the voltage from point X to ground increases above a preselected value.

I claim:

1. An electrical system, said system comprising:
   a source of alternating current power, the frequency, voltage and waveform of which fluctuate with respect to time and having an impedance to limit the maximum current available therefrom;
   first circuit means coupled to said source and containing at least one device normally nonconductive in a given direction, and which may be rendered conducting in said direction responsive to a control signal applied thereto;
   means for supplying said control signal to said device until the voltage output of said first circuit means reaches a desired level, and removing said control signal when said first circuit means output rises above said level; and
   an active, low pass filter with a feedback loop set to a desired direct current voltage, and with an input terminal coupled to the output of said first circuit means, the output of said active, low pass filter adapted to supply direct current to said load.

2. The system recited in claim 1 wherein said device comprises a controlled rectifier.

3. An electrical power system comprising:
   at least two three-terminal solid state devices of the type normally not conducting in a given direction but that may be rendered conducting between first and second terminals in response to a control signal applied between the third terminal and the second terminal, with the first terminals of both said devices electrically connected, and the second terminals of said devices coupled to a source of power flow, the third terminal of each device connected through rectification means to a common control point;
   an additional three-terminal solid state devices normally not conducting in a given direction and which may be rendered conducting in said direction between first and second terminals thereof in response to a control signal applied between the third terminal and second terminal, the first terminal of said additional devices coupled to said common connection of said first terminals of said first two devices, and the second terminal of said additional device being coupled to said common control point.

4. An electrical circuit comprising:
first, second and third three-terminal circuit devices, each of said first, second and third devices including an input terminal, an output terminal, and a common input-output terminal;
said second circuit device having its common input-output terminal coupled to the output terminal of said first device, and its output terminal coupled to the input terminal of said first device;
said third circuit device having its common input-output terminal coupled to the input terminal of said second device, and its output terminal coupled to the common input-output terminal of said first device; and
capacitive means effectively coupled between said common input-output terminal and the input terminal of said third circuit device.

5. The electrical system recited in claim 1 wherein said source of alternating current comprises and engine-driven alternator, the speed of which varies with engine speed.

6. The electrical system recited in claim 5 wherein said engine-driven alternator comprises a permanent magnet alternator.

7. The electrical system recited in claim 1 wherein said first circuit means comprises two or more control rectifiers, each having cathode, anode and gate terminals.

8. The electrical system recited in claim 7 further comprising a diode connected between each gate of each control rectifier and the means for supplying said control signal.

9. The electrical system recited in claim 7 further comprising means for producing substantial voltage between the cathodes of said control rectifiers.

10. The electrical power system recited in claim 3 or 5 wherein said three-terminal devices comprises silicon control rectifiers.

11. The electrical power system recited in claim 4 wherein the output terminal of said third device is directly connected to the common input-output terminal of the first device.

12. The electrical power system recited in claim 4 wherein the first circuit device carries the highest current level, the second circuit device carries the intermediate current level, and the third circuit device carries the lowest current level.

13. An electrical circuit comprising:
first, second and third three-terminal circuit devices, each of said first, second and third devices including an input terminal, an output terminal, and a common input-output terminal;
said second circuit device having its common input-output terminal in direct electrical connection to the output terminal of said first device, and its output terminal coupled to the input terminal of said first device;
said third circuit device having its common input-output terminal coupled to the input terminal of said second device, and its output terminal coupled to the common input-output terminal of said first device; and wherein
said direct electrical connection of the common input-output terminal of said second circuit minimizes the voltage drop between the output and common input-output terminals of said first device, and which produces a circuit having the current gain of all three of said circuit devices while maintaining a very low saturation voltage between the current-carrying output and common input-output terminals of said first device.

14. A system for controlling power transfer from an alternator to a direct current load comprising:
(a) an alternator;
(b) a direct current load;
(c) at least one semiconductor having a control electrode device and capable of blocking the flow of current in a given direction between said alternator and said direct current load until the application of a signal at said control electrode and thereafter allowing the flow of current in said direction;
(d) a first amplifying device with an input terminal, an output terminal and a common input-output terminal, said output terminal coupled to control the signal to said control electrode, and said input terminal connected to be biased on by a signal relative to said common input-output terminal by a portion of the output from said alternator; and
(e) another circuit device connected to remove said on-biased signal in response to a selected condition of said direct current load.

15. The system recited in claim 14 wherein said another device is an amplifying device connected to said direct current load through voltage reference means.

16. The system recited in claim 14 further comprising:
(a) a current control network; and wherein
(b) said input terminal is connected to said current control network for providing a selected level for the on-biased signal from said portion of the alternator output.

17. The system recited in claim 16 wherein said current control network is a resistor.

18. The system recited in claim 16 wherein said current control network is a resistor and a rectifier in series with said resistor.

19. A system for supplying power from a permanent magnetic alternator to a direct current load comprising a silicon-controlled rectifier (SCR), a first transistor having an input terminal, and a current control network, with said SCR connected to control the flow of current from said alternator to said load, the gate terminal of said SCR being connected to respond to the output of said first transistor, the input terminal of said first transistor connected through said current control network to render said first transistor conducting during a selected portion of said alternator cycle, and bypass circuit means coupled with said system to bypass the output of said current control network in response to a preselected voltage level of the direct current load.

20. The system recited in claim 19 wherein said bypass circuit means comprises a second transistor and a voltage reference element, said second transistor coupled to bypass the output of said current control network in response to an input signal to said second transistor derived from the voltage across said direct current load minus the voltage across said voltage reference element.

* * * * *